F. SHUMAN.
UTILIZING WASTE HEAT OF DISTILLATION.
APPLICATION FILED MAY 1, 1907.
992,814.
Patented May 23, 1911.
2 SHEETS—SHEET 2.
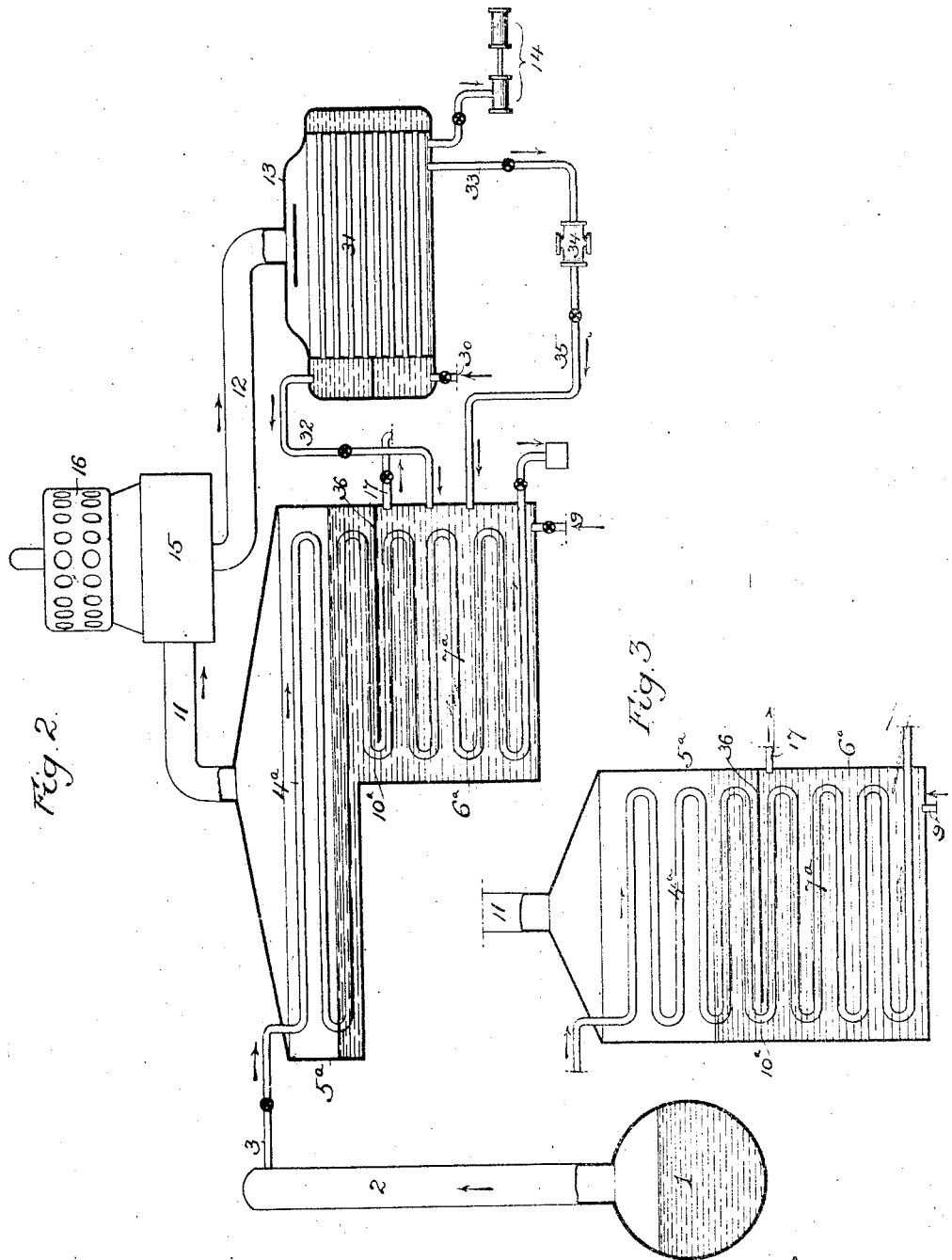
Witnesses
Harry L. Smith
Hamilton D. Turner
Inventor
Frank Shuman
by his Attorneys
Smith & Frazer

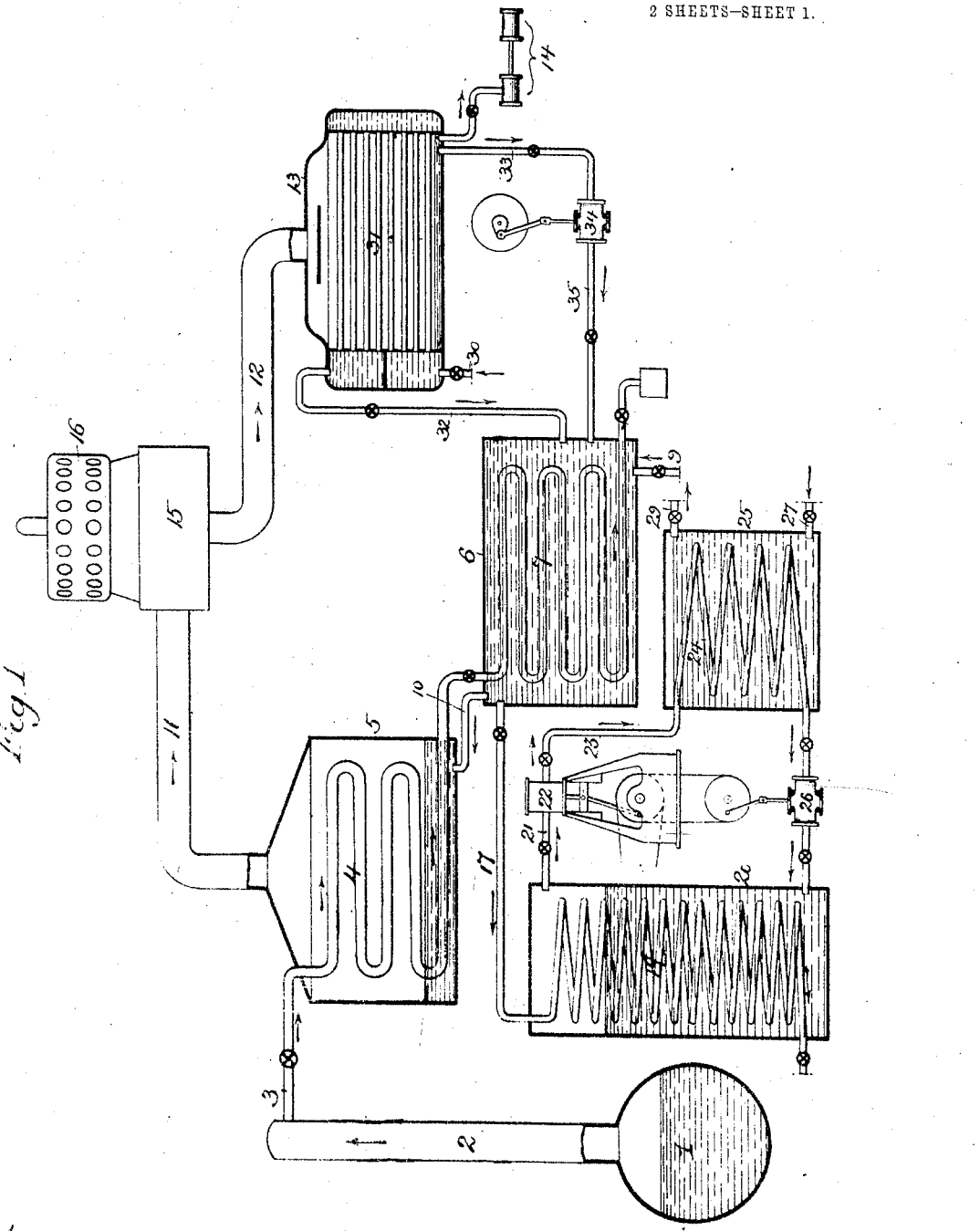

UNITED STATES PATENT OFFICE.

FRANK SHUMAN, OF PHILADELPHIA, PENNSYLVANIA.

UTILIZING WASTE HEAT OF DISTILLATION.

992,814.  Specification of Letters Patent.  Patented May 23, 1911.

Application filed May 1, 1907. Serial No. 371,279.

*To all whom it may concern:*

Be it known that I, FRANK SHUMAN, a citizen of the United States, residing in Philadelphia, Pennsylvania, have invented certain Improvements in Utilizing Waste Heat of Distillation, of which the following is a specification.

The object of my invention is to utilize, for the performance of useful work, heat which is now wasted in the operation of stills of various kinds. This object I attain in the manner hereinafter set forth, reference being had to the accompanying drawings, in which—

Figure 1 is a diagrammatic representation of apparatus for utilizing waste heat of distillation in accordance with my invention; Fig. 2 is a similar view of part of the apparatus, illustrating a slightly modified type of condenser forming part of the same, and Fig. 3 is a view illustrating still another type of condenser which may be employed in carrying out my invention.

In the operation of oil and other stills it is customary to convey the vapor through a condenser through which water is also caused to flow in a reverse direction, and, although the vapor may, at times, reach a temperature as high as 600° F. when it issues from the still, the water must be passed through the condenser in such large quantities, in order to insure the reduction of the distillate to the desired low temperature, that generation of steam, even at low pressure, from the condensing water has not hitherto been effected. By my invention, however, I am enabled to raise the temperature of the condensing water to such a degree that it will generate vapor under pressure below, at, or above that of the atmosphere, at which temperature its heat energy can be converted into energy of velocity. I can also, if desired, utilize temperatures much below the boiling point of the water for the further generation of power.

In the drawing, 1 represents a still of any ordinary character having the vertical column 2, from the upper end of which the vapor escapes through a pipe 3, this pipe being first coiled as shown at 4, in a condensing vessel 5, and then passing into a condensing vessel 6, in which it is coiled as shown at 7. Water enters the lower portion of the condenser 6 through a pipe 9, and a portion of this water, after being heated by contact with the coil 7, escapes from the condenser 6 through a pipe 10 and enters the lower portion of the condenser 5, in which it is further heated by contact with the coil 4, the vapor passing from the condenser 5 through a pipe 11 to a suitable engine, in which it is utilized for the production of power, and is then exhausted through a pipe 12 into a condenser 13 in which as close an approach as possible to a perfect vacuum has previously been created by means of a vacuum pump 14. By preference the engine employed is one of the low pressure turbine type, which is represented at 15 in the drawing as directly connected to a dynamo 16. The condensing water need not be heated in the condenser 5 to such a temperature as to generate steam under a pressure at or above that of the atmosphere, although its temperature should always be so high that some or all of its heat energy will be converted into energy of velocity under the degree of vacuum produced by the action of the condenser 13. The remainder of the water heated in the condenser 6 passes through a pipe 17 to a coil 19 in a pressure generator 20, in which is contained an agent having a boiling point lower than the boiling point of water, the heat of the water passing through the coil 19 serving to vaporize this agent, and the vapor under pressure being conveyed from the generator 20 through a pipe 21, to an engine 22, of any suitable type, wherein the pressure of the vapor is utilized, the exhaust from the engine 22 passing through a pipe 23 to a coil 24 in a condenser 25 and the condensed vapor being returned by a pump 26 to the lower portion of the generator 20 for revaporization therein. Condensing water is supplied to the vessel 25 through a pipe 27, and escapes therefrom through a pipe 29. The condensing water enters the condenser 13 through a pipe 30 and, after circulating through the tubes 31 of the condenser, escapes from the latter and passes through a pipe 32 into the condenser 6 at a point where the water in the latter is of about the same temperature as that escaping from the condenser 13. The condensed steam or vapor is conveyed from the condenser 13 through a pipe 33 to a pump 34, and is thereby forced through a pipe 35 into the condenser 6 at a point corresponding with the level at which the water in said condenser approximates in temperature that of said condensed steam or vapor.

The temperature of the water in the condenser 6 may be raised to a temperature approaching the boiling point, so that when this water is admitted into the condenser 5 it will be at once vaporized by the highly heated coil 4 in said condenser, and steam under pressure above that of the atmosphere will thereby be generated, the flow of water through the pipe 10 from the condenser 6 to the condenser 5 being so regulated as to prevent the flooding of said condenser 5, and thus maintain a constant generation of steam in the latter.

The volume and rate of flow of the water in the condenser 5 can be independent of the volume and rate of flow of the water in the condenser 6, and the water may be passed through the latter condenser in such volume as to insure the lowering of the temperature of the distillate to the desired degree without affecting the heating of the water to the desired degree in the condenser 5 by the highly heated condenser coil 4, all of the surplus water from the condenser 6 being passed over into the generator 20 for the purpose of vaporizing the low-boiling agent employed as motive power for the engine 22. By this means all of the heat contained in the distillate escaping from the still is effectively utilized and a very large percentage of this heat is available for the generation of steam, or vapor for power purposes, the generator for the vaporization of the low-boiling agent being incidental or being omitted altogether when it is not considered necessary to utilize all of the waste heat of distillation.

Another advantage of my invention is the reduction in the amount of condensing water required, owing to the fact that the water can be maintained in contact with the vapor coil in the condenser 5 for a sufficient length of time to abstract from said vapor all of the heat units in excess of 212° F. the duty of the condenser 6 being to absorb the heat units between 212° F. and the degree of temperature to which the distillate is to be reduced.

In that form of apparatus shown in Fig. 2, also in that shown in Fig. 3, both condensers 5ª and 6ª are contained in the same casing, which is, however, divided into two chambers by means of a partition 36, these chambers communicating with each other through a contracted passage 10ª which constitutes the equivalent of the pipe 10, in Fig. 1, the surplus water from the condenser 6ª escaping as before through a pipe 17. In the apparatus shown in Fig. 2 the condenser 5ª has a greater area than the condenser 6ª in order to provide for a greater expanse of coil 4ª for the circulation of the distillate through said upper condenser.

So far as I am aware I am the first to provide for the heating of water in the condenser of a still, to such a temperature that power can be developed therefrom in a suitable engine, and the first to use in connection with such condenser a low-pressure turbine engine in which the large volumes of relatively low pressure steam or vapor supplied by such condenser can be utilized to the best advantage.

It will be understood that the various pipes are to be provided with suitable valves and that the members of the apparatus will be supplied with pressure gages and other equipments usual in such apparatus, and further that no attempt has been made in the drawing to show the relative size and location of the different parts of the apparatus.

I claim:

1. The mode herein described of utilizing waste heat of the vapor resulting from the distillation of a liquid, said mode consisting in condensing said vapor by means of water and applying the water at the beginning of the condensing operation in limited quantity, whereby its temperature will be raised to such a degree that its heat energy can be converted into energy of velocity.

2. The mode herein described of utilizing waste heat of distillation, said mode consisting in subjecting the vapor issuing from the still to a two-stage condensation, by means of a flow of condensing water, and maintaining in one stage of the condensation a rate of flow of the condensing water different from that in the other stage.

3. The mode herein described of utilizing waste heat of distillation, said mode consisting in subjecting the vapor issuing from the still to a two-stage condensation, by means of a flow of condensing water, using the condensing water first in the second stage of the condensation, and then subjecting a portion of the water thus partially heated to further heating in the first stage of the condensation.

4. The mode herein described of utilizing waste heat of distillation, said mode consisting in subjecting the vapor issuing from the still to a two-stage condensation, by means of a flow of condensing water, using the condensing water first in the second stage of the condensation, then subjecting a portion of the water thus partially heated to further heating in the first stage of the condensation, and continuing the latter action until the temperature of the water is raised to a degree at which it will vaporize.

5. The mode herein described of utilizing waste heat of distillation, said mode consisting in subjecting the vapor issuing from the still to a two-stage condensation, by means of a flow of condensing water, using the condensing water first in the second stage of the condensation, and then subjecting a portion of the water thus partially heated to further heating in the first stage of the condensation until its temperature is raised to a degree at which it will generate steam under a pressure greater than atmospheric pressure.

6. The mode herein described of utilizing waste heat of distillation, said mode consisting in subjecting the vapor issuing from the still to a two-stage condensation, by means of a flow of condensing water, using the condensing water first in the second stage of the condensation; then subjecting a portion of the water thus partially heated to further heating in the first stage of the condensation to still further raise its temperature, and discharging the condensing water from the second stage of the condensation independently of the discharge from the first stage.

7. The mode herein described of utilizing waste heat of distillation, said mode consisting in subjecting the vapor issuing from the still to a two-stage condensation, by means of a flow of condensing water, maintaining a flow in one stage of the condensation different from that in the other stage, affecting a raise of temperature of the condensing water from normal to a point approaching the boiling point by the second stage of the condensation, and, by the first stage of the condensation, converting into steam a portion of the condensing water thus preheated by the second stage of the condensation.

8. The mode herein described of utilizing waste heat of distillation, said mode consisting in subjecting the vapor from the still to a two-stage condensation, by means of a flow of condensing water, maintaining a flow in one stage of said condensation different from that in the other stage, partially heating the condensing water by the second stage of the condensation, further heating, by the first stage of the condensation, a portion of the water thus preheated, and utilizing the remaining portion of said partially heated water for the vaporization of an agent having a boiling point lower than that of water.

9. The mode herein described of utilizing waste heat of distillation, said mode consisting in subjecting the vapor from the still to a two-stage condensation, by means of a flow of condensing water, maintaining a flow of the condensing water in one stage of the condensation different from that in the other stage, heating the condensing water by the second stage of the condensation to a point at or below the boiling point, converting into steam, by the first stage of the condensation, a portion of the water thus preheated, and discharging, independently of each other, the steam thus generated and the partially heated water from the second stage of the condensation.

10. The mode herein described of utilizing waste heat of distillation, said mode consisting in subjecting the vapor from the still to a two-stage condensation, by means of a flow of condensing water, and maintaining in the second stage of the condensation a flow of the condensing water in excess of that in the first stage of the condensation.

11. The mode herein described of utilizing waste heat of distillation, said mode consisting in subjecting the vapor from the still to a two-stage condensation, by means of a flow of condensing water, utilizing all of the condensing water in the second stage of the condensation, and deflecting a portion of it for use as condensing water in the first stage of the condensation.

In testimony whereof, I have signed my name to this specification, in the presence of two subscribing witnesses.

FRANK SHUMAN.

Witnesses:
 HAMILTON D. TURNER,
 KATE A. BEADLE.